US012479046B2

(12) United States Patent
Flores et al.

(10) Patent No.: US 12,479,046 B2
(45) Date of Patent: Nov. 25, 2025

(54) DEVICES FOR PRODUCING ROUGHENED SURFACES

(71) Applicant: GEHRING TECHNOLOGIES GMBH + CO. KG, Ostfildern (DE)

(72) Inventors: Gerhard Flores, Ostfildern (DE); Martin Freitag, Nürtingen (DE); Oliver Bey, Ostfildern (DE)

(73) Assignee: GEHRING TECHNOLOGIES GMBH + CO. KG, Ostfildern (DE)

( * ) Notice: Subject to any disclaimer, the term of this patent is extended or adjusted under 35 U.S.C. 154(b) by 989 days.

(21) Appl. No.: 17/435,282

(22) PCT Filed: Feb. 28, 2020

(86) PCT No.: PCT/EP2020/055326
§ 371 (c)(1),
(2) Date: Aug. 31, 2021

(87) PCT Pub. No.: WO2020/178189
PCT Pub. Date: Sep. 10, 2020

(65) Prior Publication Data
US 2022/0152734 A1 May 19, 2022

(30) Foreign Application Priority Data
Mar. 1, 2019 (DE) ............... 10 2019 105 295.5

(51) Int. Cl.
*B23K 26/10* (2006.01)
*B23K 26/03* (2006.01)
*B23K 26/14* (2014.01)
*B23K 26/352* (2014.01)
*B23K 37/02* (2006.01)

(52) U.S. Cl.
CPC .......... *B23K 26/106* (2013.01); *B23K 26/032* (2013.01); *B23K 26/14* (2013.01); *B23K 26/3584* (2018.08); *B23K 37/0276* (2013.01)

(58) Field of Classification Search
CPC .... B23K 26/032; B23K 26/106; B23K 26/14; B23K 26/3584; B23K 37/0276
USPC ................................... 219/121.64
See application file for complete search history.

(56) References Cited

U.S. PATENT DOCUMENTS

| 5,464,963 A | 11/1995 | Hostler et al. |
| 5,643,477 A | 7/1997 | Gullo et al. |
| 2015/0273641 A1 | 10/2015 | Mabee |
| 2018/0126488 A1 | 5/2018 | Duerr et al. |

(Continued)

FOREIGN PATENT DOCUMENTS

| CN | 108698162 A | 10/2018 | |
| DE | 202005005905 U1 * | 7/2005 | ............. B23K 26/08 |

(Continued)

OTHER PUBLICATIONS

International Search Report and Written Opinion of International Application PCT/EP2020/055326.

(Continued)

*Primary Examiner* — John J Norton
*Assistant Examiner* — Dilnessa B Belay
(74) *Attorney, Agent, or Firm* — BOND, SCHOENECK & KING, PLLC; George R. McGuire

(57) ABSTRACT

The present invention relates to apparatuses and methods for laser treatment, more particularly laser roughening, of surfaces.

9 Claims, 11 Drawing Sheets

(56) References Cited

U.S. PATENT DOCUMENTS

| | | | |
|---|---|---|---|
| 2018/0272467 A1 | 9/2018 | Montaron et al. | |
| 2021/0213566 A1* | 7/2021 | Flores | B23K 26/706 |

FOREIGN PATENT DOCUMENTS

| | | | | |
|---|---|---|---|---|
| DE | 102009024957 B3 | 9/2010 | | |
| DE | 202009004927 U1 | 10/2010 | | |
| DE | 102012216632 A1 | 3/2014 | | |
| DE | 202016103591 U1 | 9/2016 | | |
| DE | 102016103578 A1 * | 8/2017 | ......... | B23K 26/0006 |
| DE | 102017200080 A1 | 7/2018 | | |
| DE | 102019108096 A1 | 10/2019 | | |
| EP | 3187303 A1 | 7/2017 | | |
| WO | 2004108343 A1 | 12/2004 | | |
| WO | WO-2018114083 A1 * | 6/2018 | ........... | B23Q 1/0009 |

OTHER PUBLICATIONS

German Office Action for German Application 10 2019 105 295.5.
Translated Chinese Office Action, dated Aug. 27, 2023, Chinese App. No. 202080017661.9, pp. 1-18.
EP Search Report, search completed on May 11, 2017, Published on Jul. 5, 2017, pp. 1-3.
European Office Action, dated Jun. 7, 2023, European App. No. 20 711 058.6, pp. 1-4.

\* cited by examiner

DEVICES FOR PRODUCING ROUGHENED SURFACES

CROSS-REFERENCE TO RELATED APPLICATIONS

This is a National Stage Application filed under 35 U.S.C. 371 based on International Patent Application No. PCT/EP2020/055326, filed on Feb. 28, 2020, which claims priority to German Patent Application No. 10 2019 105 295.5 filed on Mar. 1, 2019, the disclosures of both of which are incorporated herein by reference in their entireties.

BACKGROUND

The invention relates to apparatuses and methods for producing roughened surfaces according to the preambles of the independent claims.

The invention is defined in independent claim 1. Further developments are given in the dependent claims and in the following description.

Laser treatment modules are known from US2018/0126488A1, DE102016103578A1, DE102017200080A1. DE102009024957B3 describes an apparatus for laser deposition welding. DE102016103578A1 describes a machine concept for laser roughening.

Roughened surfaces are usually thermally coated after roughening. Such roughening is used, for example, to improve the adhesive tensile strength of a metallic or non-metallic (spray) layer applied to the roughened surfaces. An example of this is the application in cylinder bores in internal combustion engines. The thermal spray coatings are low-friction and wear-resistant and allow internal combustion engines to be optimized, particularly with regard to reducing exhaust emissions. After roughening and thermal coating, a honing operation usually takes place, which is sometimes carried out in a plurality of steps and which can change the injection-molded surface into a tribologically suitable topography.

SUMMARY OF THE INVENTION

A first aspect of the invention relates to the further development of an apparatus for laser treatment, which is used in particular for laser roughening, the laser treatment being directed to surfaces of a plurality of workpiece openings that are spaced at a distance from one another, which in particular can be the surfaces of cylinder bores. Such an apparatus comprises at least one work station. The work station can be designed such that it comprises a workpiece holder. The workpiece holder can be arranged in the work station or can be arranged for treatment in the work station. "Can be arranged" means in this case that it can be moved into the work station, for example by means of a rotary table, wherein the workpiece to be worked can be arranged on the rotary table or in the workpiece holder arranged on the rotary table. The workpiece holder is in any case in the work station during the actual treatment. Other types of transfer devices, which can have workpiece holders or can move these into the work station, are conceivable. The transfer device will be discussed below with reference to the second aspect of the invention. The individual, a plurality of, or all features that are explained in connection with the second aspect of the invention are also to be seen as possible further developments of the first aspect of the present invention.

The rotary table (forming a transfer device) can be designed as a conventional turntable or rotary table without a lifting function, but it can also be designed as a lifting turntable. In the present sense, a rotary table means a turntable which can implement workpiece transport through a rotational movement around a rotary or turntable axis. The workpiece is usually transported on a circular path, although an additional translational movement can also be superimposed so that a workpiece movement deviating from an ideal circular path can result during transport by means of the rotary table. A rotary table in the present sense can be designed like a table, for example with a (e.g. round) flat support surface, but it can also be a different (e.g. cross-like) structure with intended workpiece positions (e.g. workpiece holders, e.g. with indexing means, which can be indexing pins).

The work station just described also comprises a laser treatment module. This laser treatment module has a module axis. The module axis means in this case an axis of the laser treatment module. Typically, the laser treatment module is designed in an elongated direction along the module axis.

The work station also has a positioning device. The positioning device is designed and arranged to bring about a relative movement between a workpiece arranged in the work station for treatment and the laser treatment module. The positioning device can move the laser treatment module, for example. Such a positioning device can be implemented, for example, via a slide or compound slide arrangement. It is also conceivable that the positioning device changes the position of the workpiece. For example, a positioning device can be implemented by a lifting function of a lifting turntable already mentioned above. A workpiece holder that can be moved in a translatory manner in the work station is also conceivable. The positioning device can also have means for moving the laser treatment module and the workpiece or a workpiece holder holding the workpiece. The relative movement between the workpiece and the laser treatment module can accordingly be implemented by moving both components. A translational relative movement along a horizontally and/or vertically extending movement axis is preferably possible.

The laser treatment module has beam guiding optics. The beam guiding optics are designed to guide a laser beam for the treatment of the surface in a discharge direction onto the surface to be treated. The discharge direction means the direction in which the laser beam leaves the laser treatment module. The discharge direction is arranged so as to be inclined with respect to the module axis and a plane orthogonal to the module axis. The laser treatment module is also designed and arranged to rotate the laser beam about the module axis. This means that the laser beam rotates about the module axis in the discharge direction. The discharge direction thus includes all discharge directions of the laser beam in a lateral surface of a cone or truncated cone, which has an inclination corresponding to the discharge direction.

The beam guiding optics have a collimator unit which is used to collimate the laser beam coming from the radiation source. The beam guiding optics further comprise a focusing unit, by means of which the already collimated laser beam is focused or can be focused. The beam guiding optics also has a discharge direction-defining beam deflecting device. The discharge direction-defining beam deflecting device is designed and arranged to deflect the laser beam for the treatment of the surface from a main optical direction into the discharge direction. The beam deflecting device is arranged in the beam path downstream of the collimator unit, and in particular downstream of the focusing unit.

Preferably, the laser beam is first introduced into the collimator unit in the direction of the beam guiding optics and is then focused in the collimated state via corresponding optical elements on the focusing unit and is then guided by the latter to the beam deflecting device, which deflects the laser beam in the discharge direction so that the laser beam emerges from the laser treatment module without any further deflection. The beam deflecting device thus defines the discharge direction of the laser beam. After the laser beam has been directed in the discharge direction by the beam deflecting device, no further deflection takes place.

According to the invention, it is now provided that the laser treatment module comprises a rotation device. This rotation device is designed to rotate the beam deflecting device relative to the collimator unit or relative to the collimator unit and the focusing unit about the module axis. This rotation causes the exiting laser beam to rotate about the module axis. The laser treatment module comprises a further beam deflecting device in the optical path upstream of the discharge direction-defining beam deflecting device. This further beam deflecting device deflects the laser beam in the main optical direction. With the present construction, a slim design of the laser treatment module can be realized. In addition, it is advantageous that few components of the laser treatment module have to be moved mechanically. The wear of the treatment module can be reduced. The rotation device or beam guiding optics having a corresponding rotation device can be designed to be slim along the main optical direction.

A second aspect of the present invention relates to an apparatus which can relate in particular according to the preamble of claim 1 or the just described embodiment of the invention according to the first aspect of the invention. However, the apparatus does not have to be designed according to the first aspect just described, but can be designed independently and designed for laser roughening, in particular of surfaces, in particular workpiece openings, in particular surfaces of cylinder bores. The apparatus according to the second aspect in any case comprises at least one loading and unloading station. In the loading and unloading station, a workpiece to be treated can be loaded into the apparatus and, furthermore, an already treated workpiece can be removed (unloaded) from the apparatus. The loading and unloading station can be connected to other treatment machines via a conveyor belt, for example. However, it is also conceivable that the loading and unloading station can be loaded and unloaded via a portal loader or also manually.

The apparatus according to the second inventive aspect furthermore has a work station. The work station can be designed in accordance with the work station of the first inventive aspect mentioned at the outset. In any case, the work station has a laser treatment module for the treatment of workpieces in the work station. This laser treatment module is preferably designed according to the features of the laser treatment module of the first inventive aspect.

The apparatus according to the second inventive aspect furthermore has a transfer device. The transfer device, in turn, is designed to carry out a workpiece transfer between the loading and unloading station and the work station. The features of the second inventive aspect just described can also be provided in an apparatus of the first inventive aspect. For the purposes of the present invention, an apparatus can therefore include the individual features of both inventive aspects. This results in particularly advantageous apparatuses. The apparatus according to the second inventive aspect is now characterized in that the transfer device is designed to carry out a transfer process of a workpiece to be treated from the loading and unloading station into the work station by means of a rotary movement, and, at the same time, to carry out a transfer process of a treated workpiece from the work station to the loading and unloading station by means of the same rotary movement. A workpiece transfer of a treated workpiece from the work station into the loading and unloading station and a workpiece transfer from the loading and unloading station into the work station can thus take place at the same time. In this way, the cycle time of the apparatus according to the invention can advantageously be improved. The apparatus according to the invention is further characterized in that it comprises a closure device which is arranged and designed to separate in a shielding state the loading and unloading station from a work space of the work station in a laser-safe manner. This ensures that, during the laser treatment, the workpiece that has already been treated, which was transferred from the work station to the loading and unloading station in the transfer process described above, can be removed therefrom, while a laser treatment process of the workpiece transferred from the loading and unloading station to the work station in the transfer process can be carried out in the work station.

Further developments of both inventive aspects will now be described. The apparatuses of both aspects, but in particular of the first aspect, can comprise a rotation device which comprises a direct drive. This means that the drive for the rotation device is not designed externally and is transmitted to the laser treatment module via a force transmission device, for example a V-belt, a toothed belt, or a similar force transmission means.

It can further be provided that the direct drive is designed as a hollow shaft drive. This means that one component of the drive is non-rotatably connected with respect to the housing and another component is arranged rotatably with respect to the housing and, when the drive is in operation, the two components rotate in opposite directions, the rotation taking place around an axis of the hollow shaft drive and both parts being arranged around this axis. The axis of the hollow shaft drive coincides in particular with the module axis.

The stator of the hollow shaft drive is preferably connected to the housing of the laser treatment module in a rotationally fixed manner. A rotor of the hollow shaft drive can be rotated about an axis of the hollow shaft drive (its axis of rotation). This axis of rotation can correspond to the module axis.

The rotor of the hollow shaft drive is typically made hollow, so that the beam can be guided along the module axis through the hollow rotor of the hollow shaft drive. The described direct drive allows a very precise rotation of the laser beam, and by designing it as a hollow shaft drive, in particular with the design of stator and rotor just described, a very compact design of the laser treatment module is possible, whereby the rotation of the laser beam can be carried out with very high precision and speed.

This allows the apparatus to be designed very flexibly. For example, at least two such laser treatment modules can be provided, which in turn can be used for the treatment of two workpieces or, depending on the work cycle, for the treatment of the same workpiece (for example different openings). This is particularly advantageous in combination with the above-mentioned transfer device, in particular if it can move 2 workpieces each into the work station or into the work space thereof. The combination of a turntable as an apparatus-internal transfer system offers particular advantages, in particular in combination with the design of the laser treatment module described at the outset and below. The transfer system allows quick loading of the work station in which, in turn, a treatment can be carried out very quickly and precisely via the laser treatment module designed with the rotating beam deflecting device. The laser treatment module has a low level of inertia, since only a few components with a low mass have to be set in motion during rotation. As a result, the rapid loading (transfer system) of the work station is combined with fast treatment in the work station, which allows an overall lower cycle time. This is further supported by the closure device, which only requires a minimal opening phase in order to allow loading and unloading of the work station at the same time (rotary movement of the transfer system). The laser treatment module, the transfer device, and the closure device therefore complement one another and are coordinated with one another in order to ensure the highest possible clocking of the apparatus with low non-productive times.

Since the discharge direction-defining beam deflecting device is rotated with respect to the other optical components of the system, they can be designed to be rigid and thus space-saving and robust. It is advantageous if only the beam deflecting device rotates or can be rotated during operation out of the optically acting components (influencing the type or profile and/or direction of the laser beam). The other optically acting components can be rigidly connected to the housing of the laser treatment module.

The focusing unit can, for example, be connected to the housing in a rotationally fixed manner; in particular, the focusing unit can be arranged within the rotor. The focusing unit can be held via a sleeve-like element which extends into the rotor and is connected to the housing.

The laser beam can be coupled or is couplable into the laser treatment module via a connection point for a light guide.

The laser treatment module preferably has at least two, in particular at least three beam deflecting devices.

The final direction of the laser beam leaving the laser treatment module is determined by means of the first discharge direction-defining beam deflecting device. The first further beam deflecting device deflects the laser beam from a direction, in particular orthogonal, inclined to the main optical direction, in particular a collimator direction in which the collimator unit collimates the laser beam, into the main optical direction. Along the main optical direction, the laser beam strikes the discharge direction-defining beam deflecting device. By means of a second further beam deflecting device, the beam can be deflected, for example coming from a connection point, and guided onto the collimator unit. However, such a deflection is optional. The beam can also be guided onto the collimator unit without prior deflection. The position of the connection point for a light guide can be adjusted accordingly in its position on the laser treatment module.

The further beam deflecting device can be designed as an interference mirror. The further beam deflecting device can be arranged downstream of the collimator unit along the beam path.

The focusing unit can in particular be arranged between the first beam deflecting device and the discharge direction-defining beam deflecting device.

Downstream of the focusing unit, a radiation-permeable sealing unit can be provided which prevents dirt from penetrating into the laser treatment module or its optical path with the collimator unit and the focusing unit.

The further beam deflecting device, designed as an interference mirror, is designed and arranged such that it guides the laser beam in the intended direction onto the other optically acting components (influencing the type and/or direction of the laser beam), in particular onto the focusing unit and then onto the discharge direction-defining beam deflecting device. By being designed as an interference mirror, the further beam deflecting device can guide an optical signal coming from the treated surface (e.g. emitted and/or reflected radiation signal emitted from the treated surface) in the direction of a sensor connection point. For this purpose, it is arranged such that the laser beam is guided in the intended direction along the optical path to the workpiece surface, while an optical signal coming from the workpiece surface along the optical path is decoupled from the optical path of the laser beam and is fed to a sensor connection point (e.g. via further optically acting components).

It can be provided that the laser treatment module comprises a tapered spindle portion. The spindle portion is usually rotationally symmetrical and elongated or, in other words, is designed to be slender. The spindle portion is used for insertion into the workpiece opening to be treated and is designed accordingly. This is particularly advantageous when treating cylinder bores. It can be provided in particular that the direct drive is arranged at a distance from the spindle portion. This spacing relates to a view along the module axis. The direct drive is typically arranged above the spindle portion. By "above" it is meant that the direct drive of the spindle portion is arranged on the side of the workpiece opening from which the spindle portion was introduced into the workpiece opening during the insertion process.

Since the main optical direction coincides with the module axis, the beam guiding optics are designed such that the laser beam runs partially along the module axis and is guided along this onto the beam deflecting device. In particular, the laser beam can be guided from the focusing unit to the beam deflecting device along the module axis. In other words, the laser beam runs along the module axis between the focusing unit and the beam deflecting device.

The laser treatment module may comprise a process gas flow path. This process gas flow path can comprise a portion extending along the main optical direction. This portion can be arranged between the first further beam deflecting device and the discharge direction-defining beam deflecting device. The process gas flow path is preferably arranged and designed such that the process gas leaves the laser treatment module via the outlet opening of the laser beam and is guided via this to the point on the workpiece surface to be treated. For this purpose, the outlet opening can be designed like a nozzle (imposing one direction on the outflowing process gas).

With regard to the positioning device, it can be provided that the positioning device can bring about a relative movement between the workpiece arranged for treatment in the work station and the laser treatment module, this relative movement running in a plane orthogonal to the module axis or in the direction of the module axis; in particular, the module axis can run in the vertical direction with the usual alignment of the apparatus and the relative movement between the workpiece and the laser treatment module can run accordingly in the horizontal and vertical directions. For example, a movement of the laser treatment module in the horizontal direction from one cylinder bore to the next and a lowering of the spindle portion into the respective cylinder bores in the vertical direction is conceivable.

As already stated, the positioning device can comprise a slide arrangement, in particular it can be provided that a compound slide arrangement is provided with which the directions of a relative movement that are orthogonal to one another can be implemented. In particular, the relative movements that can be carried out in directions orthogonal to one another can also be carried out superimposed (in the sense of at the same time).

The laser treatment module can be designed so as to be arranged directly on the slide arrangement. As already stated above, the individual features of the second inventive aspect can be provided individually or in various combinations for the first inventive aspect and vice versa. In both aspects, but in particular in the second inventive aspect, it can be provided that the transfer device is designed as a turntable. The transfer device thus forms a workpiece conveying device which conveys workpieces into and out of the work station via a rotational movement. The transfer device can be designed with a plate-shaped surface. A support surface can be provided between the individual workpiece receptacles or the intended workpiece positions, which also rotates during the rotary movement.

In particular, it can be provided that the transfer device is designed as a lifting turntable which, in addition to the rotary movement, is also capable of a lifting and lowering movement running along the axis of rotation. The turntable can be designed to transfer at least two workpieces from the loading and unloading station to the work station at the same time, and vice versa, at least two workpieces from the work station to the loading and unloading station at the same time, in the same transfer process. For this purpose, the transfer device (or the turntable) typically has a corresponding number of receptacles for workpieces (or positions provided for workpieces) which are each arranged on the turntable offset by 180 degrees. In particular, the 180 degree offset arrangement makes it possible in a simple manner to allow workpieces to be transported in and out of the loading and unloading station or work station at the same time.

The closure device can comprise an openable and closable partition wall. The combined use of the partition wall with the transfer device allows for particularly short loading times. The partition wall is opened and the transfer device begins to rotate at the same time. This rotational movement of the transfer device causes the work station to be loaded and unloaded at the same time. The partition wall can be closed again as soon as the workpieces have passed the position of the partition wall. Such a partition wall can have a double-walled structure in order to satisfy active laser protection. A cavity can be delimited by an outer wall by this double-walled outer wall and the partition wall can furthermore comprise a sensor unit which is designed and arranged to detect when laser radiation from the laser treatment module penetrates into the cavity. In this way, the closure device can virtually detect as soon as a part of the outer wall surrounding the cavity is damaged by the laser and laser radiation penetrates the interior before the further outer wall delimiting the cavity is breached and laser radiation can penetrate from the work station or the work space to the surroundings. An emergency shutdown of the laser treatment module can then be carried out accordingly. This increases the safety of the apparatus according to the invention.

The work space can be designed with a suction device. The suction device can in particular comprise a plurality of suction openings which are arranged in the work space. In particular, in a treatment position of the treated workpiece in the work space of the work station, suction openings can be arranged below the processed workpiece. The laser treatment module can be introduced into the workpiece openings from above and perform laser treatment. The suction device or suction openings can generate an air or gas flow from the top of the treated opening into the suction device and efficiently suck off any dirt that appears in the course of the laser treatment process. Correspondingly, gas contaminants that could hinder or make further laser treatment difficult or impair their quality are also sucked out.

It can further be provided that the apparatus comprises at least one beam source compartment which is separate from the work space of the work station. A radiation source for the laser beam provided for treatment can be arranged in the beam source compartment. A light guide can be provided in order to guide the laser beam from the radiation source into the work space or to the laser treatment module at the work station. It can therefore be provided that a radiation source for the laser treatment module is arranged spatially separated from the work station in a separate beam source compartment. This increases the operational safety of the system. This also makes it easier to protect the radiation source from contamination. As a result, the work space can also be designed with a small volume, so that the suction of contaminated air is simple and efficient.

The invention also relates to a method. Such a method thus relates to a method for laser treatment, in particular the laser roughening of workpiece openings, wherein such workpiece openings can in particular be surfaces of cylinder bores. The corresponding method is carried out using an apparatus for laser treatment. Such an apparatus for laser treatment can be, for example, an apparatus according to the first or the second inventive aspect or according to their generic terms.

The method comprises the steps of:

positioning a workpiece to be treated in a work station of the apparatus;

positioning a spindle portion of a laser treatment module of the apparatus in the workpiece opening to be treated of the workpiece which is located in the work station;

The positioning of the workpiece to be treated can mean the transfer process carried out via a rotary movement, which is carried out with the transfer apparatus described above. The positioning of the spindle portion of a laser treatment module in the workpiece opening can be, for example, a retraction movement by moving the laser treatment module; for this purpose, the laser treatment module is preferably moved in the vertical direction, in particular downward. It is also conceivable that the workpiece is virtually pushed onto the spindle portion of the laser treatment module. A superimposed movement of both components is also conceivable. Irradiating the surface of the treated workpiece opening by means of an, in particular continuous, laser beam directed into the workpiece opening via the laser treatment module.

The laser beam is rotated about the module axis during this irradiation of the surface. The rotation is preferably carried out at a constant angular velocity. However, the angular velocity can also be variable.

When carrying out the method, a laser treatment module is used which comprises beam guiding optics which are designed to guide a laser beam for the treatment of the surface in a discharge direction that is inclined relative to the module axis and a plane which is orthogonal to the module axis onto the surface to be treated.

The method according to the invention is characterized in that, for the rotation of the laser beam, a beam deflecting device of the laser treatment module, which deflects the laser beam for the treatment of the surface in the discharge direction, rotates relative to a collimator unit of the laser treatment module for collimating the laser beam coming from the radiation source or relative to the collimator unit and a focusing unit of the laser treatment module, which is designed to focus the collimated laser beam, about the module axis in order to effect the rotation of the exiting laser beam about the module axis.

The rotational movement of the beam deflecting device can be superimposed on a translational relative movement between the workpiece and the beam deflecting device of the laser treatment module. The translational relative movement can be implemented by a movement of the laser treatment module, the workpiece, or both, or generally by a relative movement between the workpiece and the laser treatment module. The translational relative movement is accordingly directed along the direction of the module axis. In particular, it is conceivable that the laser treatment module is introduced into the workpiece opening in a translatory manner along the module axis (with a correspondingly provided speed) and, parallel to this introduction movement, the rotation of the laser about the module axis is superimposed and thus (with continuous or incremental translational movement) the surface of the workpiece is irradiated.

It can be provided that the translational movement takes place continuously. This results in a kind of spiral, traversed path of the laser. The translational movement can, however, also take place step by step, so that the beam deflecting device is almost always rotated by 360 degrees and then the laser is moved further inward into the workpiece opening in one step. This can result in a quasi-annular scanned path of the surface. The laser beam does not have to scan the entire 360 degrees of the surface.

It can be provided that the laser treatment module comprises a rotation device which is designed to rotate the beam deflecting device about the module axis relative to the collimator device or relative to the collimator device and the focusing unit. This rotation causes the exiting laser beam to rotate about the module axis. The rotation device can comprise a direct drive which, when viewed in the direction of the module axis, is arranged outside, in particular above or in the insertion direction of the spindle portion of the laser treatment module in front of the workpiece opening of the workpiece to be treated. In other words, the laser treatment module is, however, not retracted up to the direct drive into the workpiece opening during the treatment process with the spindle portion.

It can be provided that, within the scope of the method according to the invention, the laser treatment step is followed by a brushing of the treated surface in order, for example, to remove excessive unevenness of the surface caused by soiling. Instead of or in addition to this, blowing off can also take place. For this purpose, the apparatuses according to the invention can also comprise a corresponding brushing station or blow-off station which is arranged spatially separated from the work station. In particular, it can be provided that workpieces can be fed from the loading and unloading station to the brushing station and/or blow-off station via a workpiece transport device of the apparatus.

In the method according to the invention, carrying out a monitoring of the treatment process can be provided at the same time as the laser treatment. For this monitoring, an optical signal coming from the treated surface can initially be guided along the optical path of the laser used for treatment in the laser treatment module and decoupled from the optical path of the laser beam by means of a beam deflecting device, which can in particular be designed as an interference mirror. This decoupled signal can then be fed to a sensor connection point.

In the method according to the invention, the workpiece to be treated can be positioned in the work station of the apparatus in a transfer process of a transfer device, an already treated workpiece being removed from the work station at the same time in the transfer process by means of a rotary movement of the transfer device. It can be provided that in the transfer process two workpieces are conveyed into and out of the work station. During irradiation of the surface of the workpiece opening to be treated, one workpiece opening can be treated at the same time for each workpiece by means of a laser treatment module. It is also possible that initially at least two workpiece openings are treated at the same time in a workpiece using two different laser treatment modules and then further workpiece openings are treated by means of the laser treatment modules; these further workpiece openings can, for example, be two workpiece openings in the other workpiece.

In the method according to the invention, it can be provided that a closure device, which spatially separates the work space from a loading and unloading station, is opened in order to carry out the transfer process. Those workpieces which leave the work station in the transfer process and the workpieces which are moved into the work station in the transfer process pass the closure device at the same time, when viewed spatially. The closure device is then closed so that the work space is spatially separated from the loading and unloading station.

It is also possible to provide a wall-like closure device by means of a rotary table that forms on the transfer device, which initially pivots into an open position by rotating the rotary table and, when the rotation is completed by 180°, separates again the work station or the work space from the loading and unloading station in the opposite position than in the initial state. For example, a wall arranged vertically on the turntable or rotary table can be provided between two oppositely arranged workpiece holders of the rotary table or turntable.

In the method according to the invention, it can be provided that at least one workpiece having a plurality of openings to be treated is treated by means of the laser; in this case, the currently untreated openings can be covered during the laser treatment by a cover assigned to the laser treatment module in use.

The laser treatment module can comprise at least one first sealing gas device or a first sealing gas flow path, which has a sealing gas outlet which is arranged in the region of, however at a distance from, the outlet opening of the laser beam. The sealing gas outlet can in particular be arranged on the spindle portion. The sealing gas outlet can in particular be arranged on the half of the spindle portion which includes the outlet opening. The sealing gas inlet can be arranged for this first sealing gas flow path on the housing of the laser treatment module, when viewed along the module axis, at a distance from the rotation device (direct drive), in particular arranged opposite the spindle portion (the rotation device is arranged between the sealing gas inlet and the sealing gas outlet, when viewed along the module axis). The sealing gas outlet can in particular be arranged on the spindle portion between a rotating part and a part of the spindle portion that is non-rotatable with respect to the housing. The sealing gas outlet can be designed to be circular in the circumferential direction. The first sealing gas flow path can in particular also be designed such that the sealing gas flows through the gap between rotor and stator of the hollow shaft drive of the rotation device.

The laser treatment module can alternatively or additionally also be designed with a second sealing gas device or a second sealing gas flow path (the terms "first" and "second" are used herein only to distinguish the two sealing gas flow paths and are not intended to describe either of the sealing gas flow paths as a condition for the other. However, the laser treatment module preferably has both sealing gas flow paths described herein).

The connection of the second sealing gas device (second sealing gas inlet) can be arranged in a portion of the housing in which the collimator unit is arranged. This portion of the housing can be designed separately from the portion of the housing which comprises the rotation device (direct drive). This portion can in particular be designed to be elongated in the radial direction. The second sealing gas flow path can in particular comprise both the optical path in the region of the collimator unit, in particular from the connection point for the laser source to the collimator unit, and the optical path from the collimator unit to the focusing unit. It can be provided that the sealing gas (of the second sealing gas device) fills the sleeve-like element in which the focusing unit is held from the inside thereof.

In the method according to the invention, the sealing gas is introduced into the laser treatment module such that it is at overpressure in relation to the atmosphere, so that sealing gas always penetrates to the outside at any leakage points and at the outlet of the first sealing gas flow path, and impurities in the laser treatment module are prevented from entering.

The sealing gas flow paths described so far are fluidically separated from one another and each have their own inlet. It is conceivable that the two sealing gas flow paths are fluidically connected to one another and in particular have a single common inlet.

The laser treatment module can also include a process gas connection and a process gas flow path.

In particular, the use of a process gas can be provided if the laser treatment module is designed without a sealing unit. The process gas is introduced into the laser treatment module. The process gas flow path is designed in particular such that the process gas flows along the outside of the sleeve-like element, which is used to hold the focusing unit.

The process gas preferably flows in the direction of the outlet opening and leaves the laser treatment module via the outlet opening. The outlet opening is preferably configured such that it forms a type of nozzle which directs the exiting beam of the process gas onto the point on the workpiece surface that is treated by the laser beam. The process gas surrounds the laser beam and can therefore serve as a kind of protective gas when treating the surface.

The laser treatment module can be designed such that the process gas flow path is separated from the first sealing gas flow path by a seal. The seal can in particular be arranged between a stationary part of the housing and a part of the laser treatment module that can be rotated by the rotation device.

According to the invention, in particular in the method according to the invention, process gas and sealing gas can each be nitrogen. The sealing gas can also be purified compressed air.

The laser treatment can be followed by an optical or tactile surface measuring device, which checks the treatment result through a measurement or, in the event of deviations from the target quality, performs feed-back functions on the treatment of subsequent parts, with which the treatment parameters are optimized.

It can be provided that the closure device is opened and closed via the rotary movement of the transfer device. It can be provided that the side of the partition wall forming the closure device facing the work station changes with each transfer process. It can be provided that the closure device comprises a partition wall which is fixedly arranged on the turntable.

BRIEF DESCRIPTION OF THE DRAWINGS

Further details and characteristics of the present inventions are explained below with reference to the drawing, in which.

DETAILED DESCRIPTION

Corresponding parts and regions bear the same reference signs in the following figures.

Figure 1:
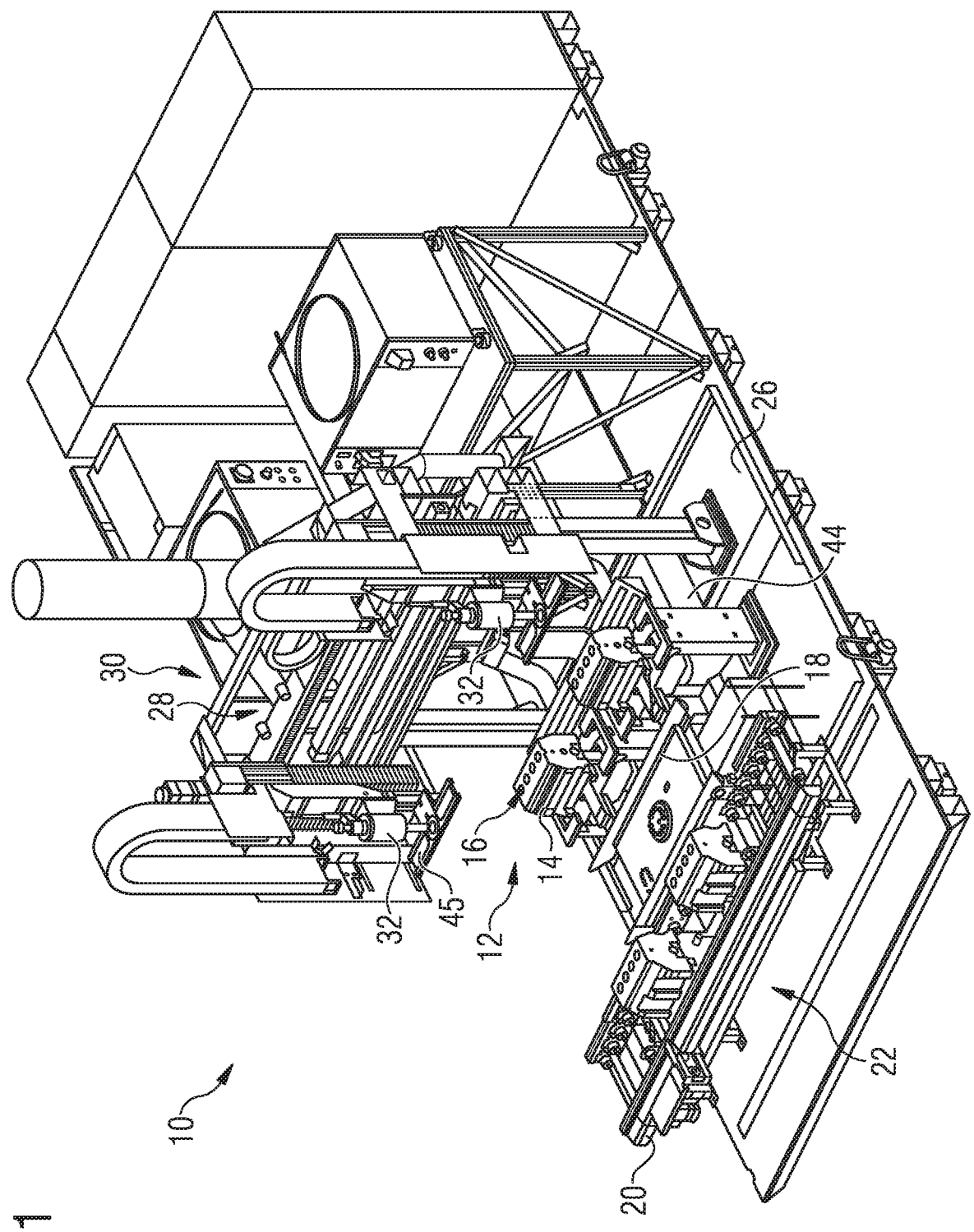
FIG. 1 is a perspective view of an apparatus according to the invention for laser treatment, a housing of the apparatus not being shown.

FIG. 1 shows a schematic perspective representation of an apparatus 10 for laser treatment. In the present case, the apparatus is designed for laser roughening of surfaces of a plurality of workpiece openings that are at a distance from one another, in the present case cylinder bores. The apparatus comprises a work station 12 in which workpieces 14 to be treated, which in the present case are formed by cylinder blocks having a plurality of cylinder bores 16, can be subjected to laser treatment.

The workpieces to be treated are fed to the work station 12 by means of a transfer device 18. In the present case, the transfer device 18 is designed in the form of a turntable.

The transfer device 18 is designed and arranged such that it can transfer workpieces 14, which are transported to a loading and unloading station 22 via a belt conveyor 20, by means of a rotary movement in a transfer process from the loading and unloading station 22 to the work station 12. At the same time, by means of the transfer device 18, workpieces 14 (which have already been treated) can be moved simultaneously from the work station 12 into the loading and unloading station 22 in the same transfer process.

In the present case, the apparatus 10 is shown without a housing 24 that is usually present. The apparatus 10 comprises a machine bed 26. In addition to the machine bed 26, the apparatus further comprises a positioning device 28, which in the present case is designed as a slide arrangement 30 (in this case a compound slide arrangement). Two laser treatment modules 32 are arranged on the slide arrangement 30 or the positioning device 28. The laser treatment module 32 and its structure are explained in detail below in connection with FIGS. 5 to 7.

A relative movement between the laser treatment module or modules 32 and the corresponding workpieces 14 can be brought about by means of the positioning device 28. In the present case, the laser treatment module 32 is moved for this purpose, while the workpieces 14 remain in their position relative to the machine bed 26.

Figure 2:
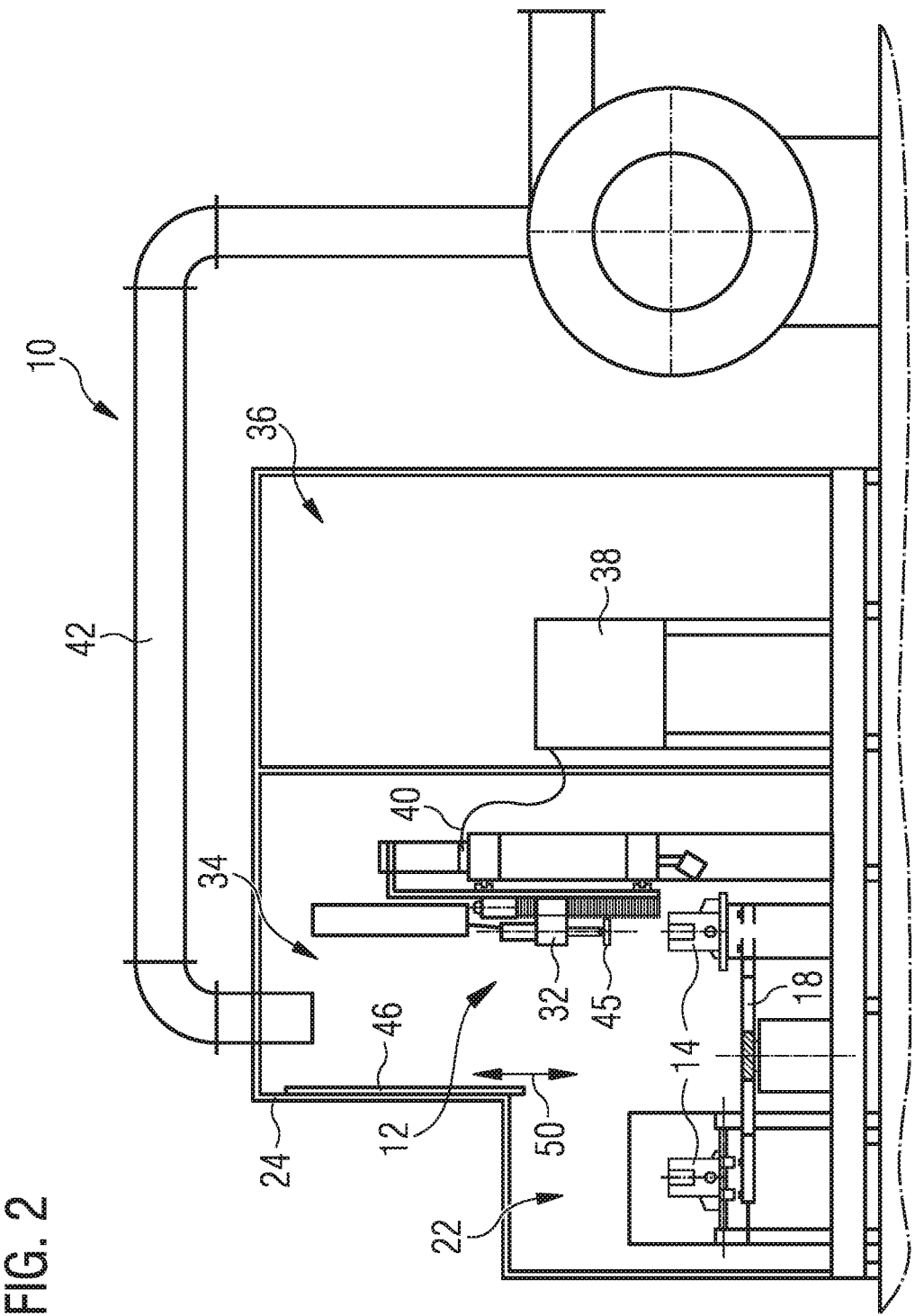
FIG. 2 is a sectional view through a schematically illustrated apparatus according to the invention.

FIG. 2 shows the apparatus 10 from FIG. 1 in a schematic side sectional view. In FIG. 2, the housing 24 is shown schematically. The housing defines a work space 34 arranged around the work station. In addition to the work space 34, the apparatus 10 further comprises a radiation source compartment 36 which is separate from the work space 34. A radiation source 38 for providing the laser beam provided for treatment, which is coupled into the laser treatment module 32, is arranged in the radiation source compartment 36. The radiation source 38 is connected via a light guide 40 to the laser treatment module 32 for coupling in the laser beam.

The apparatus 10 has a first suction device 42 which generally vents the work space 34. In addition, the apparatus 10 has a second or a plurality of second suction devices 44 for each laser treatment module 32, each of which has a suction opening below the workpiece openings to be treated in each case. The laser treatment modules 32 each have a diaphragm device 45 which is designed such that it can close any workpiece openings that are arranged at a distance from the opening provided for the treatment. Each laser treatment module 32 can be moved relative to the corresponding diaphragm device 45. The diaphragm device 45 can be placed on the cylinder block 14 and the laser treatment module 32 can be inserted through an opening in the diaphragm device 45 into the workpiece or the cylinder block 14 or the cylinder bore 16.

Figure 3:
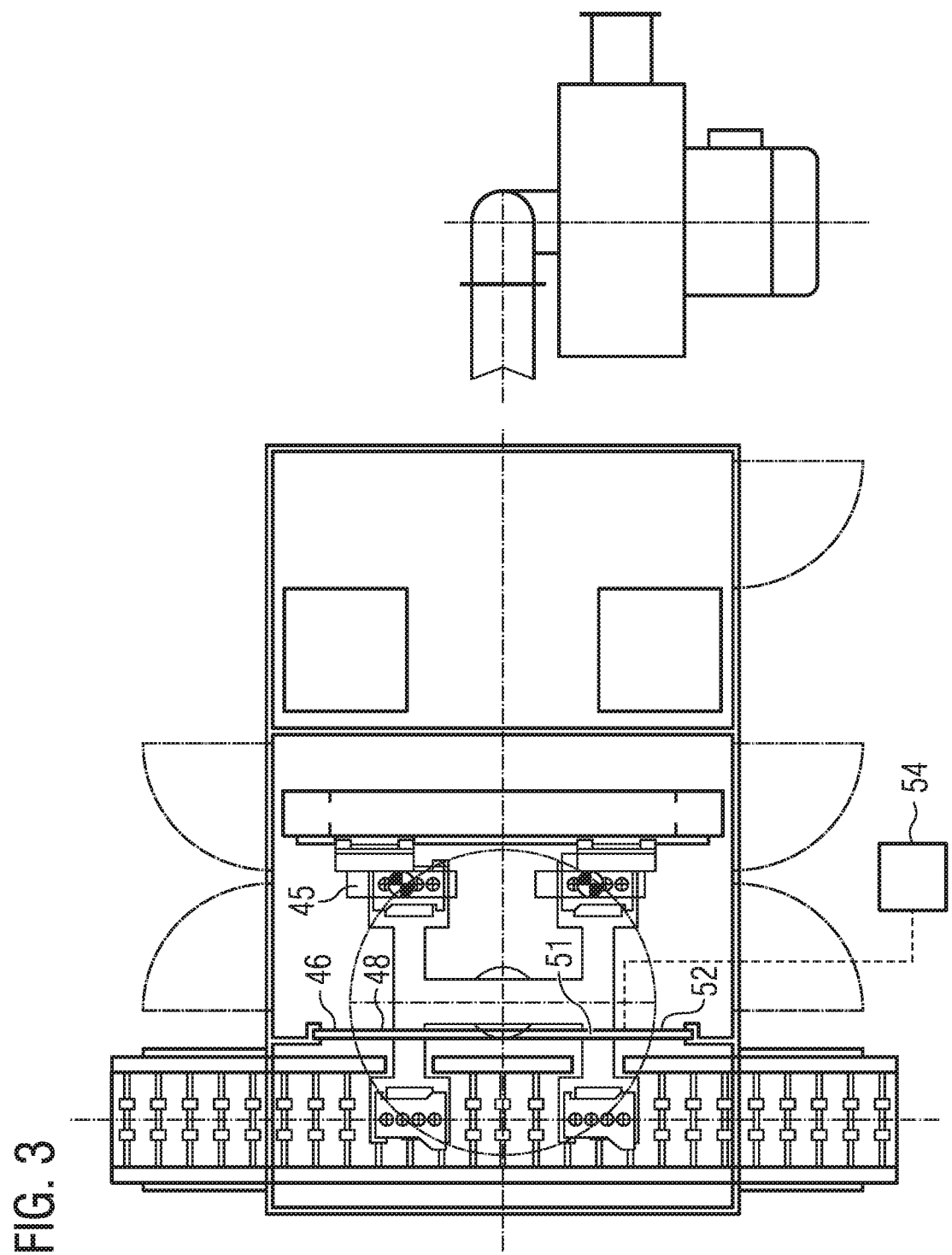
FIG. 3 is a plan view of an apparatus according to the invention, shown schematically, the housing of the apparatus being only partially shown.
Figure 4:
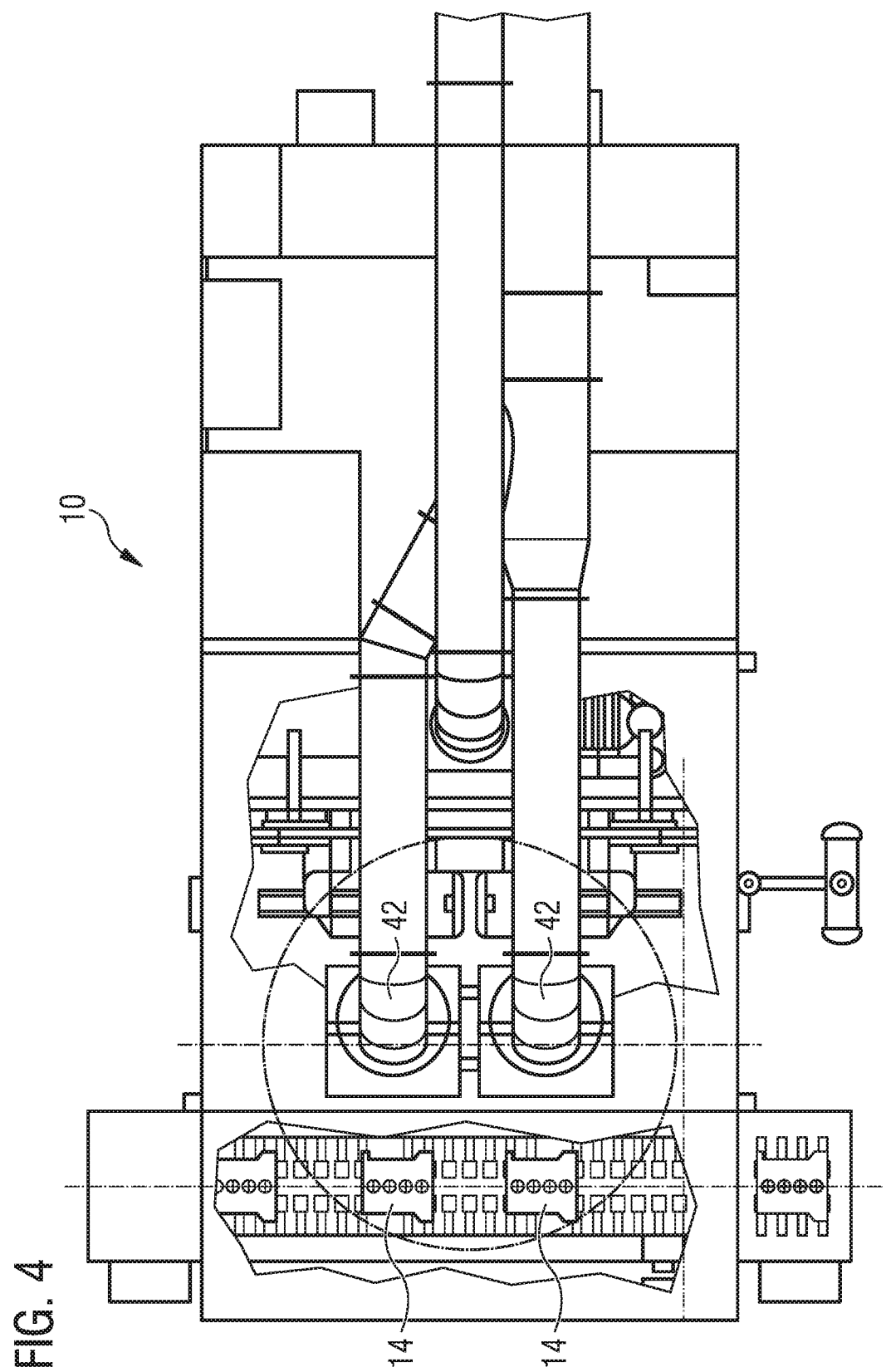
FIG. 4 is a plan view of the housing of the apparatus with partial openings through the housing.

As can be clearly seen in FIGS. 2 and 3, the apparatus 10 has a closure device 46 which comprises a partition wall 48 that can be opened and closed. This can be moved vertically or horizontally to open and close. In the present case, the partition wall 48 is designed to be movable in the vertical direction, which is indicated by the double arrow with the reference sign 50 in FIG. 2.

The work station 12 or the work space of the work station 12 can be separated from the loading and unloading station 22 by means of the closure device 46 or the partition wall that can be opened and closed. In this case, separable means a radiation-safe separation, so that laser beams exiting from the laser treatment module 32 cannot penetrate from the work space into the loading and unloading station 22 if, for example, the laser treatment module 32 is accidentally switched on without a workpiece 14 being provided.

For this purpose, it is advantageous if the partition wall 48 and other walls have a double-walled structure. In this double-walled structure, a cavity 51 within the partition wall 46 can be delimited by an outer wall 52. The partition wall 46 can comprise a sensor unit 54, which is shown only symbolically in FIG. 3 and is designed and arranged to detect when laser radiation from the laser of the laser treatment module 32 penetrates into the cavity 51 of the partition wall 48.

The sensor unit 54 can therefore detect if the outer wall of the partition wall 46 is breached by the laser beam and accordingly an emergency shutdown of the laser treatment module 32 can be carried out before both outer walls delimiting the cavity 51 have been completely penetrated by the laser.

The closure device 46 in combination with the transfer device 18 offers particular advantages of the present apparatus 10. The transfer device 18 can, at the same time, load the work station 12 and unload already treated workpieces from the work station 12 back into the loading and unloading station 22 by means of a rotary movement within a transfer process. To this end, the closure device 46 must be opened. Since the loading and unloading processes can be carried out at the same time, only a minimal opening time of the closure device 46 is necessary for this and a particularly high cycle time and operational safety of the present apparatus 10 are ensured. In order to increase the cycle time even further, it is provided that the transfer device 18, which is designed as a turntable, can transfer, in this case, two workpieces 14 per transfer process from the loading and unloading station 22 to the work station 12 and, vice versa, can transfer two workpieces 14 from the work station 12 to the loading and unloading station 22 at the same time, in the same transfer process.

Figure 5:
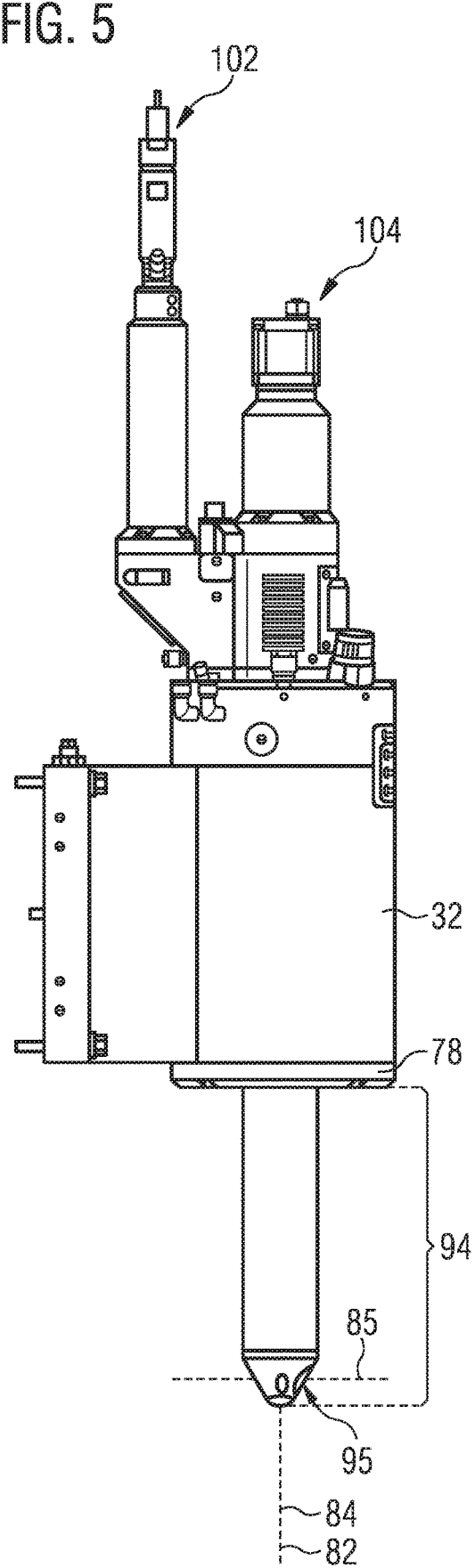
FIG. 5 shows a laser treatment module as used in the apparatus according to the invention.
Figure 6:
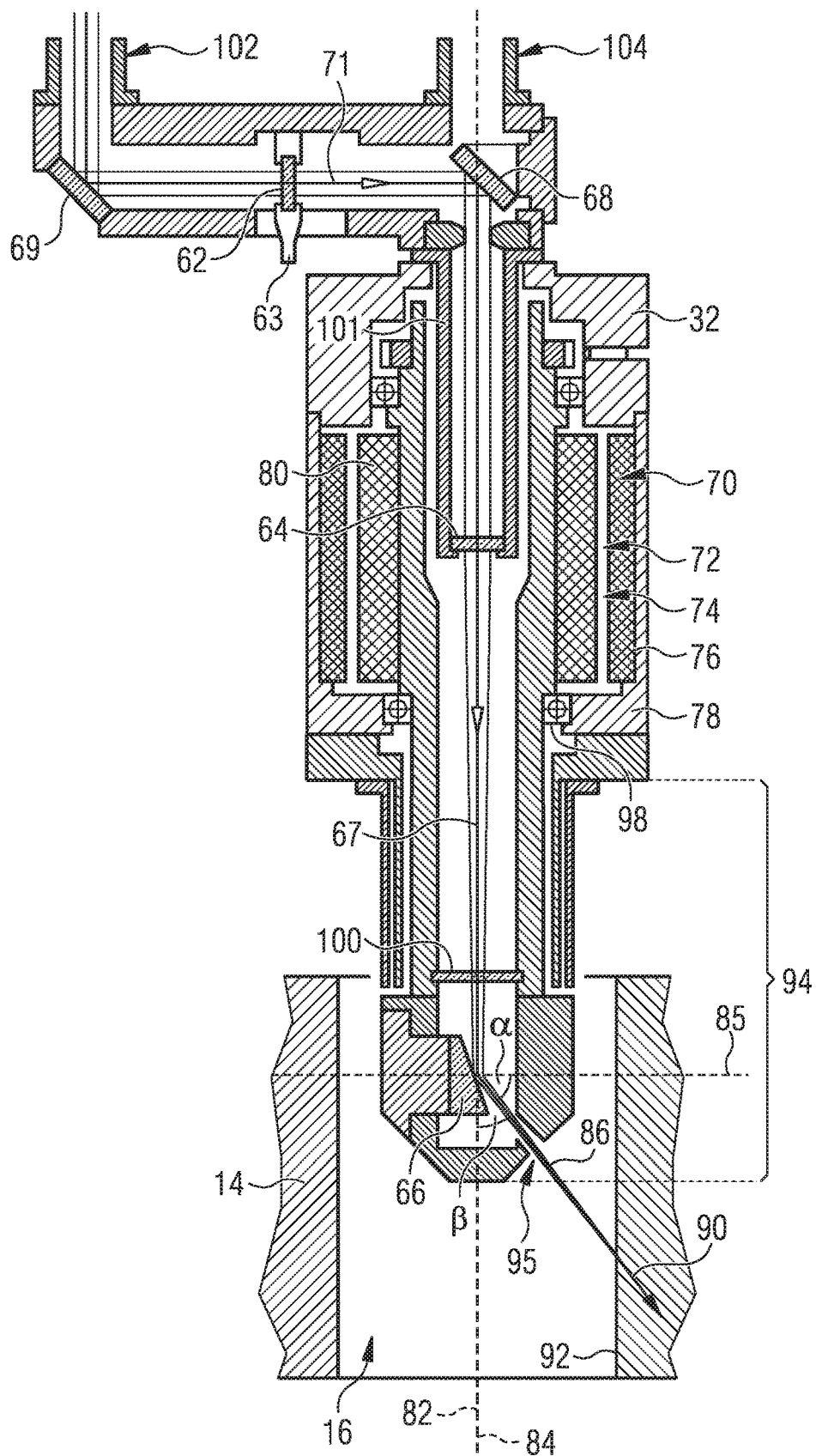
FIG. 6 is a sectional view through a schematic view of the laser treatment module from FIG. 5.

The positioning device 28 is designed such that the two laser treatment modules 32 can be used for the treatment of different workpieces 14, but, at the same time, the positioning device 28 also allows the laser treatment modules 32 to be moved such that both laser treatment modules 32 can process the same workpiece 14, for example in adjacent openings. This is also supported by the fact that the laser treatment modules 32 are designed to be particularly slim and space-saving. For this purpose, the laser treatment modules 32 have a special structure that allows a compact design with high precision and reliability at the same time. The laser treatment modules 32 are each constructed as illustrated in FIGS. 5 to 7.

Figure 7:
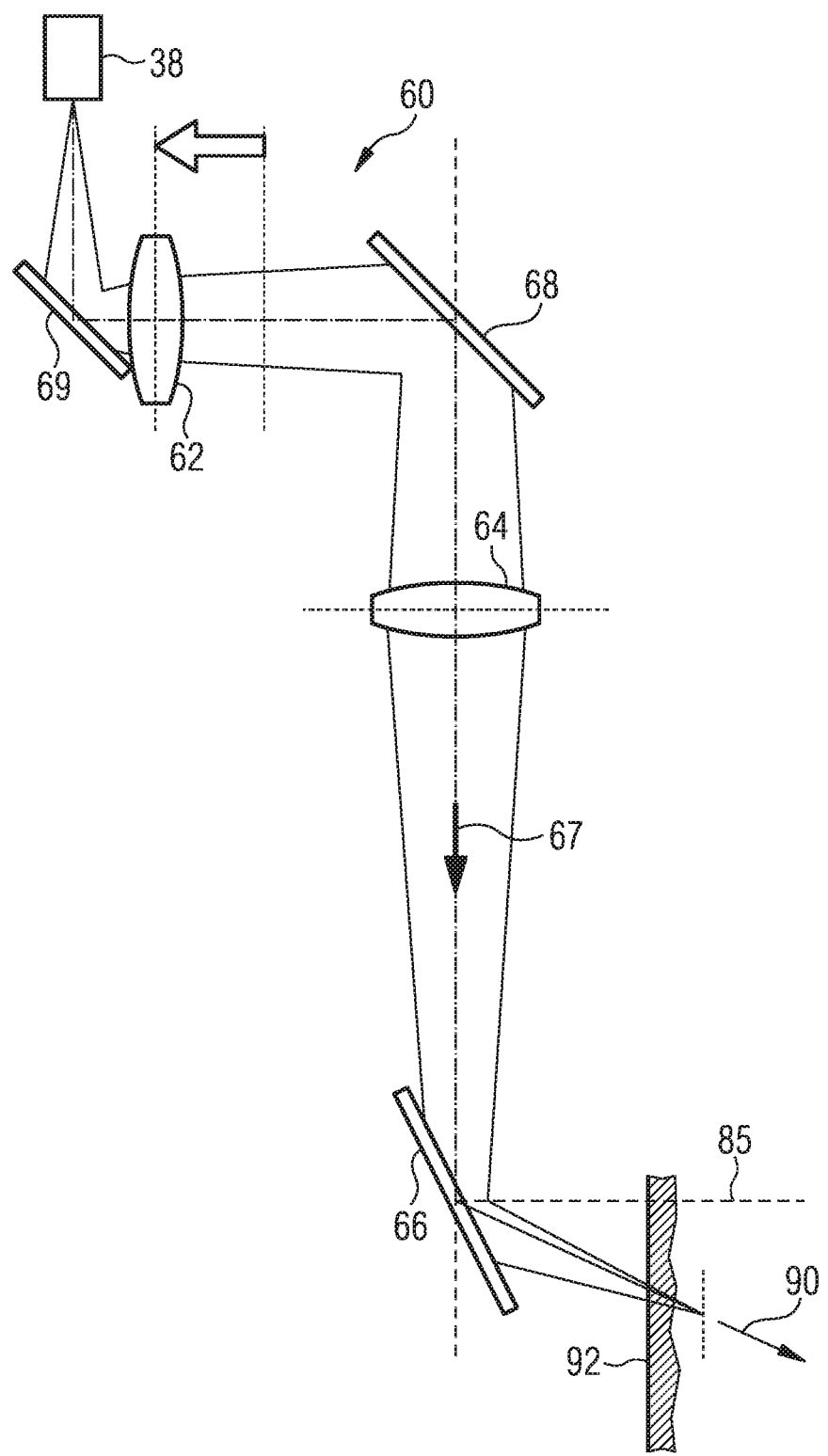
FIG. 7 is a schematic view of the beam path of the laser treatment module from FIGS. 5 and 6.

FIG. 7 shows the basic structure of a beam guiding optics 60 of the laser treatment modules 32. The beam guiding optics 60 have a collimator unit 62. The collimator unit 62 can be set using a corresponding operating device 63 or the diameter of the collimated beam can be set using the operating device 63. The collimator unit 62 can also be designed such that it can be adjusted electromechanically. The beam guiding optics 60 also have a focusing unit 64 which is designed as a focusing lens. In addition to the collimator unit 62 and the focusing unit 64, the beam guiding optics 60 also have a discharge direction-defining beam deflecting device 66. The beam deflecting device 66 defines a discharge direction 90, i.e. the direction in which the laser beam leaves the laser treatment module 32 without further deflection or is directed onto the surface to be treated. The laser beam 86 strikes the discharge direction-defining beam deflecting device 66 along a main optical direction 67, which extends along a module axis 84. The beam guiding optics 60 also comprise a first further beam deflecting device 68 and a second further beam deflecting device 69.

The first further beam deflecting device 68 deflects the laser beam 86 in the main optical direction 67. The laser beam 86 passes the focusing unit 64 along the main optical direction 67.

The second further beam deflecting device 69 deflects the laser beam 86 in a direction 71 (in the present case orthogonal) inclined to the main optical direction 67. In the direction 71 which is inclined to the main optical direction 67, the beam strikes the first further beam deflecting device 68.

FIG. 5 shows the laser treatment module 32 in a side view, the beam guiding optics 60 being arranged in a housing 78.

The present laser treatment modules 32 are designed such that both the direct drive 72 forming the rotation device 70 and the beam-shaping and deflecting optical components (beam guiding optics 60) are arranged in the laser treatment module 32. This makes the laser treatment modules 32 easy to replace, compact, and damage-resistant. All of the above components can be accommodated in a sealed manner in the laser treatment module 32 and the laser treatment module 32 only has a minimum of connection points (for example a connection point 102 for the light guide 40 for coupling in the laser beam 86). The device can thus be supplemented in a simple manner by further laser treatment modules 32, which, in combination with the transfer device, allows a high degree of flexibility with regard to the clock rate of the apparatus. A plurality of laser treatment modules 32 can thus be provided, each of which can process a plurality of workpieces in order to move the apparatus with a particularly high throughput. The transfer apparatus can convey a plurality of workpieces into the work station per transfer process. On the other hand, if only a small cycle is required, the apparatus can be quasi downgraded, in which, for example, only one workpiece is moved into the work station per transfer process and only one laser treatment module 32 is provided that the individual workpiece openings are treated sequentially.

In the sectional view of FIG. 6, it is particularly clearly illustrated that the laser treatment module 32 comprises a rotation device 70. The rotation device 70 is implemented in the present case in the form of a direct drive 72, which is designed as a hollow shaft drive 74.

A stator 76 of the hollow shaft drive 74 is connected non-rotatably to the housing 78 of the laser treatment module 32. A rotor 80 of the hollow shaft drive 74 is arranged in the laser treatment module 32 such that it can rotate about an axis of rotation 82 which coincides with the module axis 84. FIGS. 5 and 6 show a plane 85 arranged orthogonally to the module axis 84.

When the hollow shaft drive 74 is actuated, the rotor 80 and the components connected thereto are set in rotation about the module axis 84. As a result, the beam deflecting device 66 is set in rotation, so that the collimated and focused laser beam 86 provided for treatment exits in a rotating manner about the module axis 84 in the discharge direction (which is illustrated in this case by the arrow with the reference sign 90) from the laser treatment module 32 and correspondingly strikes a surface 92 of the workpiece opening 16 of the workpiece 14 to be treated.

The discharge direction 90 is inclined with respect to the module axis 84 and the plane 85 arranged orthogonally to the module axis 84, i.e. it runs relative to both at an angle other than zero degrees (angle α relative to the plane 85 and angle β relative to the module axis 84). Preferably both the angle α as well as the angle β are at least 10°, at least 20°, at least 30°.

The laser treatment module 32 has a spindle portion 94 which is designed for insertion into the workpiece opening 16 to be treated. The spindle portion 94 comprises an outlet opening 95 for the laser beam 86. The laser beam 86 leaves the laser treatment module 32 in the discharge direction 90 from the outlet opening 95.

The direct drive 72 or the hollow shaft drive 74, when viewed along the module axis 84, is arranged at a distance from the spindle portion 94, which in turn is designed to be inserted into the workpiece opening 16 to be treated.

By designing the drive of the laser treatment module 32 as a direct drive 72 or, in the present case, as a hollow shaft drive 74, the laser treatment module 32 can be made very compact. The outlet opening 95 of the laser beam 86 can advantageously be introduced into the workpiece openings 16 to be treated, so that the surfaces of the workpiece openings 16 can be efficiently treated by means of the spindle portion 94, which is arranged rotatably relative to the rest of the housing 78 of the laser treatment module 32 via bearing arrangements 98. By providing a direct drive 72, particularly precise treatment is possible, which is combined with a compact design of the laser treatment module 32. In addition, the apparatus 10 can be equipped with further laser treatment modules 32 in a simple manner, so that the cycle time of the apparatus 10 is very variable or can be increased in a simple manner.

The direct drive 72 is designed to be offset along the module axis 84 in relation to the spindle portion 94. As a result of the offset arrangement, the spindle portion 94 can be designed such that it does not include any parts of the direct drive 72 and can be designed correspondingly slim.

During operation of the laser treatment module, the spindle portion 94 can be inserted into the workpiece opening and then the laser beam 86 exiting from the laser treatment module 32 can be rotated in the discharge direction 90 about the module axis 84 by rotating the beam deflecting device 66. A lowering of the laser treatment module 32 into the workpiece opening can be superimposed on this rotation of the laser beam 86. The laser treatment module can generally be moved along the module axis 84 relative to the workpiece (movement of the laser treatment module 32 and/or workpiece 14). This movement can take place step by step, so that the laser treatment is carried out in a quasi-ring shape or continuously, so that a kind of spiral path along the surface of the opening is treated by the laser.

Since the beam deflecting device 66 is rotated with respect to the other optical components of the system, they can be designed to be rigid and thus space-saving and robust. Only the beam deflecting device 66 is rotated. In the present case, the focusing unit 64 is connected to the housing 78 in a rotationally fixed manner. The focusing unit 64 is arranged within the rotor 80. The focusing unit 64 is held via a sleeve-like element 101 which extends into the rotor 80 and is connected to the housing 78. The sleeve-like element 101 is arranged concentrically to the module axis 84.

The laser beam is coupled into the laser treatment module 32 via a connection point 102 for the light guide 40. The connection point 102 can be designed and arranged such that the laser beam is initially coupled into the laser treatment module 32 offset (as shown in the figure) or inclined relative to the main optical direction 87. By means of the second further beam deflecting device 69, the laser beam 86 is guided in the present case to the collimator unit 62 and is guided by this to a second further beam deflecting device 68, which in the present case is designed as an interference mirror. The second further beam deflecting device 68 deflects the laser beam 86 onto the focusing unit 64, and from there through the radiolucent sealing unit 100 via the beam deflecting device 66 through the outlet opening 95 onto the surface 92 to be treated. The radiolucent sealing unit 100 is optional.

The first further beam deflecting device 68 is designed as an interference mirror in order to guide an optical signal coming from the treated surface 92 in the direction of a sensor connection point 104. The first further beam deflecting device 68 guides the optical signal coming from the treated surface 92 along the main optical direction to the sensor connection point 104.

The radiation-permeable sealing unit 100 is arranged in front of the beam deflecting device 64 along the beam direction and is configured to prevent particles that arise during laser treatment or other contaminants from entering the beam path of the laser treatment module 32.

The various aspects of the two inventions implemented in the present apparatus 10 can also each be provided individually, but it is particularly advantageous if the aspects of both inventions are implemented in an apparatus according to the invention.

Figure 8:
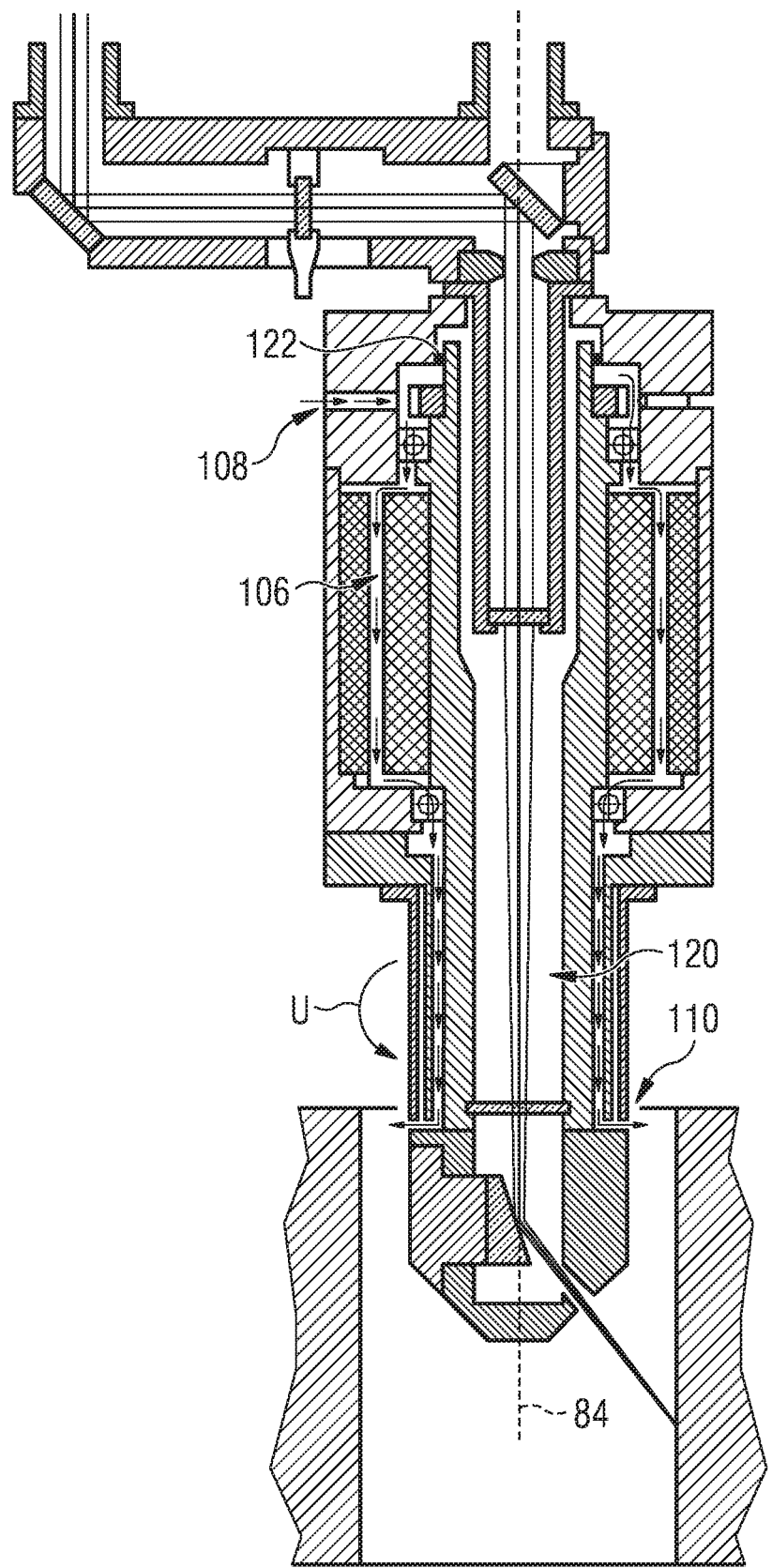
FIG. 8 is a sectional view corresponding to FIG. 6 in which a first sealing gas device or its sealing gas flow is illustrated.

FIG. 8 shows a sectional view (corresponding to that of FIG. 6), with most of the reference signs not being shown for the sake of clarity. In FIG. 8, a first sealing gas device 106 or its flow path is illustrated. The sealing gas (illustrated by arrows) prevents impurities from getting into the optical path. The sealing gas is introduced into the laser treatment module 32 via a first sealing gas inlet 108. A sealing gas outlet 110 is arranged on the spindle portion 94. The sealing gas outlet 110 is designed to be circular in a circumferential direction U (circumference of the spindle portion). The first sealing gas flow path or the sealing gas device 106 can in particular also be designed such that the sealing gas flows through the gap between the rotor 80 and the stator 76 of the hollow shaft drive of the rotation device.

Figure 9:
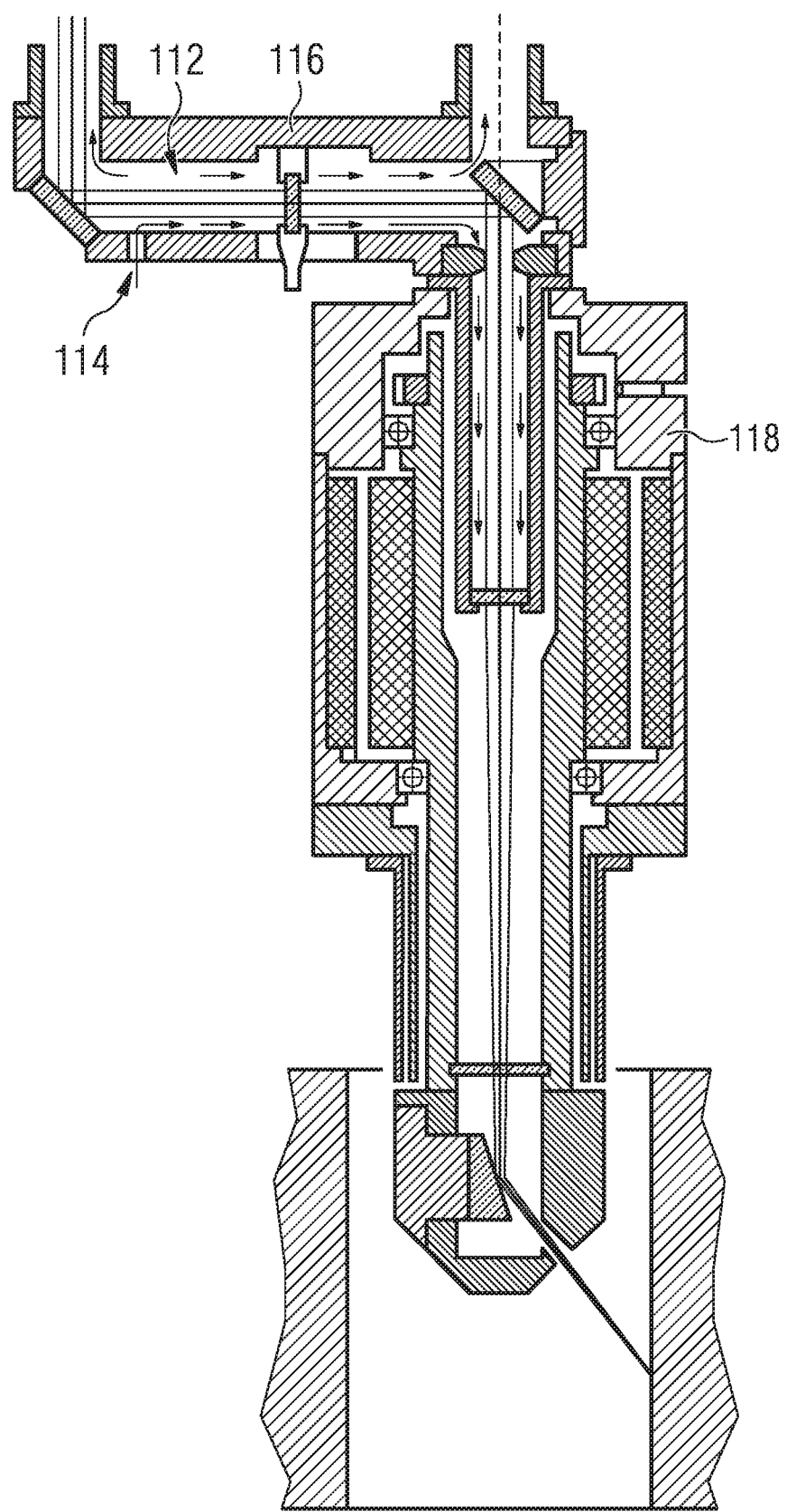
FIG. 9 is a sectional view corresponding to FIG. 6 in which a second sealing gas device or its sealing gas flow is illustrated.

The laser treatment module 32 can alternatively or additionally also be designed with a second sealing gas device 112 or a second sealing gas flow path. For the sake of clarity, this is illustrated in FIG. 9. The second sealing gas device 112 is fed with sealing gas via a second sealing gas connection 114. The sealing gas connection 114 is arranged in a portion 116 of the housing 78 in which the collimator unit 62 is arranged. This portion 116 of the housing 78 is designed separately from the portion 118 of the housing 78 which comprises the rotation device 70 (direct drive).

The sealing gas of the second sealing gas device 112 flows around the collimator 62. The sealing gas of the second sealing gas device 112 fills the sleeve-like element 101 in which the focusing unit 64 is held.

Figure 10:
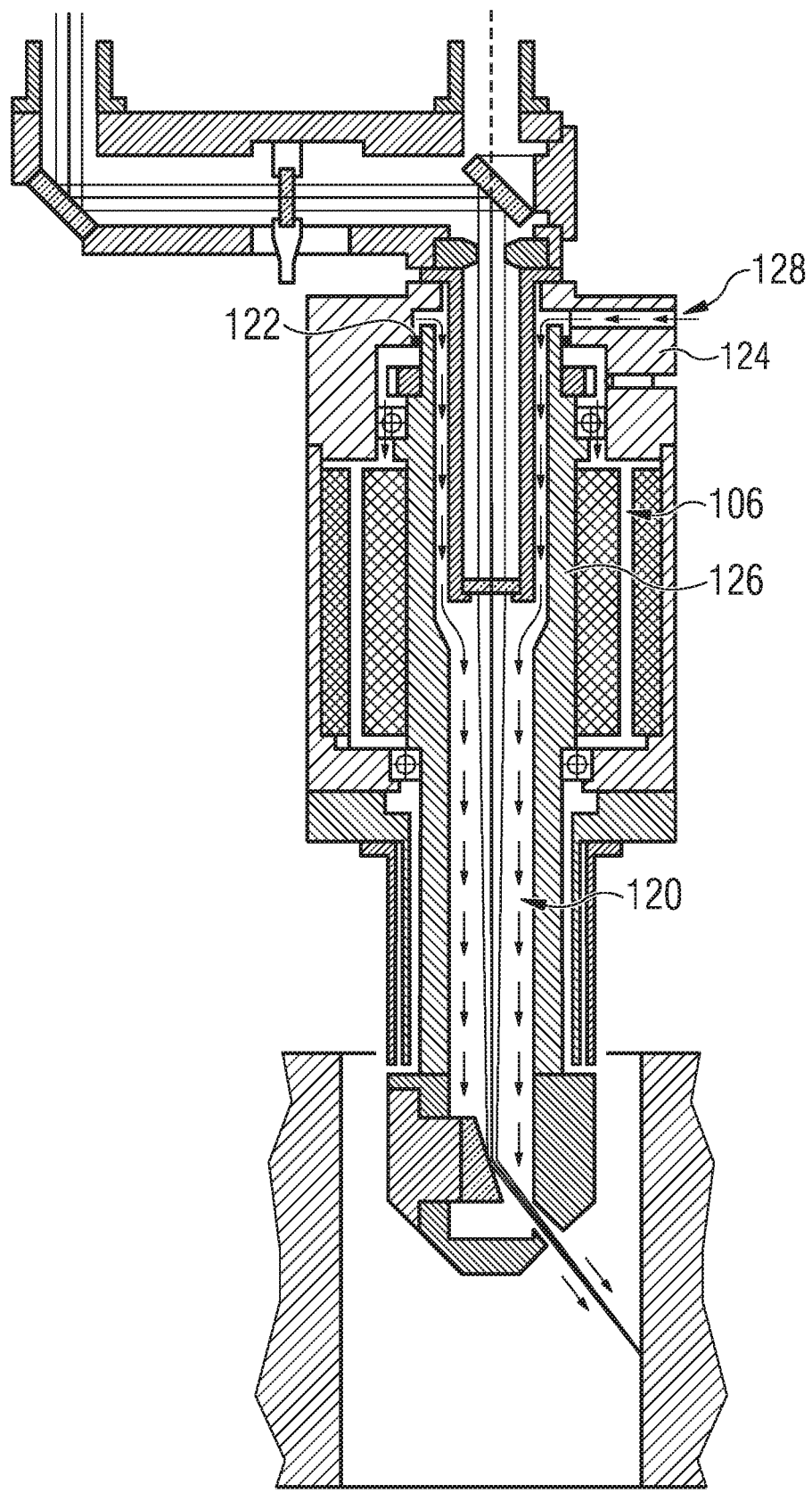
FIG. 10 is a sectional view corresponding to FIG. 6, in which a process gas flow path is illustrated.

In FIG. 10, the use of a process gas is illustrated in a representation corresponding to FIGS. 6, 8, and 9. A process gas flow path 120 is designed such that the process gas (illustrated by arrows) flows along the outside of the sleeve-like element 101, which is used to hold the focusing unit 64.

The laser treatment module 32 of FIG. 10 differs from that shown in FIGS. 6, 8, and 9 in that no sealing unit 100 is provided. The process gas flows continuously through the interior of the spindle portion 94.

The laser treatment module 32 can be designed such that the process gas flow path 120 is separated from the first sealing gas flow path 106 via a seal 122. The seal 122 can in particular be arranged between a stationary part 124 of the housing 78 and a part 126 of the laser treatment module 32 that can be rotated by the rotation device 70.

The process gas is introduced into the laser treatment module 32 via a process gas inlet. It flows around the outside of the sleeve-like element 101. It flows inside the spindle portion 94. The process gas leaves the laser treatment module 32 via the outlet opening 95. The outlet opening 95 is configured such that it forms a type of nozzle which directs the exiting flow of the process gas onto the point on the workpiece surface that is treated by the laser beam. The process gas can thus serve as a kind of protective gas when treating the surface.

Figure 11:
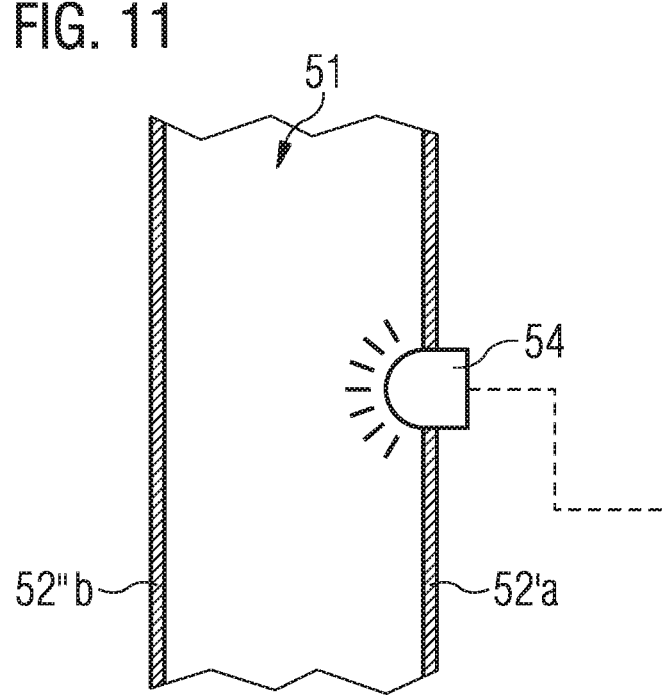
FIG. 11 is a schematic view of a partition wall.

The partition wall 46 having the cavity 51 is illustrated in FIG. 11. The partition wall 46 has the outer wall 52, which in turn comprises a first side surface 52a and a second side surface 52b, which together delimit the cavity 51.

Figure 12:
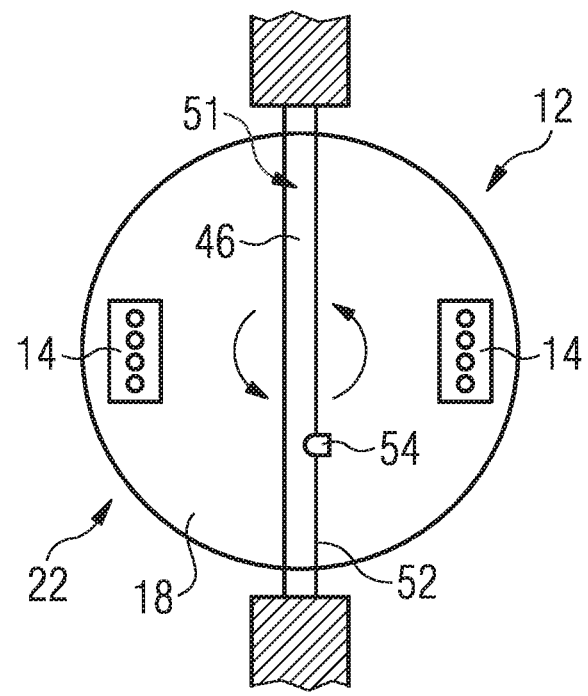
FIG. 12 is a schematic view of an alternative partition wall.

A closure device 46 according to the invention is schematically illustrated in FIG. 12, in which the partition wall is connected to the transfer device 18 and is opened and closed via its rotary movement.

What is claimed is:

1. An apparatus for laser treatment, the laser treatment being directed to surfaces of a plurality of workpiece openings that are spaced at a distance from one another, the workpiece openings being one of surfaces of cylinder bores or of a single cylinder bore, the apparatus comprising:
   a. at least a work station, wherein the work station comprises at least one laser treatment module having a module axis, and a positioning device via which a relative movement between a workpiece arranged in the work station for treatment and the laser treatment module can be effected,
   b. wherein the laser treatment module comprises beam guiding optics which are designed to guide a laser beam for the treatment of the surface in a discharge direction that is inclined relative to the module axis and a plane which is orthogonal to the module axis onto the surface to be treated, and
   c. wherein the laser treatment module is designed and arranged in order to rotate the laser beam about the module axis, the laser treatment module comprising a rotation device having a direct drive being designed as a hollow shaft drive and a rotor of the hollow shaft drive rotatable about an axis of rotation which corresponds to the module axis,
   d. wherein, the beam guiding optics comprises a collimator unit for collimation of the laser beam coming from a radiation source and a focusing unit for focusing the collimated laser beam, which is held via a sleeve-like element which extends into the rotor and is connected to the housing, and a discharge direction-defining beam deflecting device which deflects the laser beam for the treatment of the surface from a main optical direction extending along the module axis in the discharge direction, the rotation device adapted to rotate the discharge direction-defining beam deflecting device relative to the collimator unit or relative to the collimator unit and the focusing unit about the module axis in order to effect the rotation of the exiting laser beam about the module axis,
   e. wherein, the laser treatment module comprises a first further beam deflecting device in the optical path upstream of the discharge direction-defining beam deflecting device, and upstream of the focusing unit, which beam deflecting device deflects the laser beam in the main optical direction, and
   f. wherein the laser treatment module comprises a process gas flow path comprising an outlet opening and a portion extending along the main optical direction, the portion being arranged between the first further beam deflecting device and the discharge direction-defining beam deflecting device, and the process gas exiting at the outlet opening, wherein the process gas flow path is designed such that the process gas flows along the outside of the sleeve-like element, which is used to hold the focusing unit.

2. The apparatus according to claim 1 characterized in that a stator of the hollow shaft drive is connected to a housing of the laser treatment module in a rotationally fixed manner.

3. The apparatus according to claim 1, characterized in that the laser treatment module comprises a second further beam deflecting device which is designed and arranged to guide the laser beam in an inclined, orthogonal direction relative to the main optical direction, to the first further beam deflecting device.

4. The apparatus according to claim 3, characterized in that one of the further beam deflecting devices decoupling an optical signal coming along the optical path from the workpiece surface along the main optical direction, from the optical path of the laser beam and feeding it to a sensor connection point.

5. The apparatus according to claim 1, characterized in that the laser treatment module comprises a tapered spindle portion which is designed for insertion into the workpiece opening to be treated, the direct drive being arranged at a distance from the spindle portion designed for insertion into the workpiece opening to be treated when viewed along the module axis.

6. The apparatus according to claim 1, characterized in that by means of the positioning device a relative movement between the workpiece arranged in the work station for treatment and the laser treatment module is effectable, which relative movement runs in a plane orthogonal to the module axis and/or in the direction of the module axis.

7. The apparatus according to claim 1, characterized in that the positioning device comprises a compound slide arrangement, wherein the laser treatment module is arranged on the slide arrangement.

8. The apparatus according to claim 1, characterized in that the laser treatment module comprise at least one sealing gas device having a sealing gas outlet arranged in the region of the outlet opening of the laser beam, the sealing gas outlet being arranged on the half of the spindle portion including the outlet opening.

9. The apparatus according to claim 1, characterized in that the laser treatment module comprises at least one sealing gas device, which is designed and arranged to conduct sealing gas into the interior of the sleeve-like element in which the focusing unit is held.

* * * * *